US008209752B2

(12) United States Patent
Ohta

(10) Patent No.: US 8,209,752 B2
(45) Date of Patent: Jun. 26, 2012

(54) IMAGING SYSTEM AND AUTHENTICATION METHOD

(75) Inventor: Yusuke Ohta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 902 days.

(21) Appl. No.: 11/997,522

(22) PCT Filed: Aug. 3, 2006

(86) PCT No.: PCT/JP2006/315790
§ 371 (c)(1),
(2), (4) Date: Jan. 31, 2008

(87) PCT Pub. No.: WO2007/020860
PCT Pub. Date: Feb. 22, 2007

(65) Prior Publication Data
US 2010/0107242 A1    Apr. 29, 2010

(51) Int. Cl.
G06F 7/04    (2006.01)

(52) U.S. Cl. .............. 726/19; 726/1; 726/3; 726/17; 726/22; 713/186

(58) Field of Classification Search .......... 713/186; 726/19, 3, 17, 22
See application file for complete search history.

(56) References Cited

U.S. PATENT DOCUMENTS

| | | | |
|---|---|---|---|
| 6,898,299 B1 * | 5/2005 | Brooks | 382/115 |
| 6,963,659 B2 * | 11/2005 | Tumey et al. | 382/116 |
| 7,058,603 B1 * | 6/2006 | Rhiando | 705/50 |
| 7,154,375 B2 * | 12/2006 | Beenau et al. | 340/5.53 |
| 7,310,734 B2 * | 12/2007 | Boate et al. | 713/186 |
| 7,363,505 B2 * | 4/2008 | Black | 713/186 |
| 7,660,444 B2 * | 2/2010 | Hamalainen | 382/118 |
| 2002/0080256 A1 | 6/2002 | Bates et al. | |
| 2003/0012415 A1 | 1/2003 | Cossel | |
| 2005/0036656 A1 | 2/2005 | Takahashi | |
| 2005/0063566 A1 | 3/2005 | Beek et al. | |
| 2008/0298687 A1 | 12/2008 | Lai et al. | |

FOREIGN PATENT DOCUMENTS

| | | |
|---|---|---|
| CN | 1220433 A | 6/1999 |
| CN | 1568489 A | 1/2005 |

(Continued)

OTHER PUBLICATIONS

Mar. 17, 2010 Chinese official action (and English translation thereof) in connection with counterpart Chinese patent application No. 200680028887.9.

Apr. 24, 2009 Chinese official action (and English translation thereof) in connection with a counterpart Chinese patent application No. 2006800288879.

Apr. 26, 2010 European Search Report in connection with counterpart European patent application No. EP 06782595.0.

Primary Examiner — Carl Colin
Assistant Examiner — Mohammad Siddiqi
(74) Attorney, Agent, or Firm — Cooper & Dunham LLP

(57) ABSTRACT

An imaging system is disclosed that performs authentication of a user. The system includes one or more manipulation detecting parts that detect one or more manipulations by the user related to an imaging process, one or more biometric information acquiring parts that acquire biometric information of the user when the manipulation detecting parts detect the manipulations by the user, and an authentication determining part that determines an authentication result of the authentication based on the biometric information acquired by the biometric information acquiring parts.

16 Claims, 5 Drawing Sheets

FOREIGN PATENT DOCUMENTS

| | | |
|---|---|---|
| GB | 2410588 A | 8/2005 |
| JP | 2000-300828 | 10/2000 |
| JP | 2000-329945 | 11/2000 |
| JP | 2001-184483 | 7/2001 |
| JP | 2002-111924 | 4/2002 |
| JP | 2002-132733 | 5/2002 |
| JP | 2002-258682 | 9/2002 |
| JP | 2003-233279 | 8/2003 |
| JP | 2004-77990 | 3/2004 |
| JP | 2005-11142 | 1/2005 |

* cited by examiner

FIG.5

|  |  | MATCHING RESULT B | | |
|---|---|---|---|---|
|  |  | 「USER X」 | 「USER Y」 | NOT EXECUTED |
| MATCHING RESULT A | 「USER X」 | USER X | FAILURE | USER X |
|  | 「USER Y」 | FAILURE | USER Y | USER Y |
|  | NOT EXECUTED | USER X | USER Y | FAILURE |

FIG.6

|  |  | MATCHING RESULT B | | |
|---|---|---|---|---|
|  |  | 「USER X」 | 「USER Y」 | NOT EXECUTED |
| MATCHING RESULT A | 「USER X」 | USER X | FAILURE | FAILURE |
|  | 「USER Y」 | FAILURE | USER Y | FAILURE |
|  | NOT EXECUTED | FAILURE | FAILURE | FAILURE |

IMAGING SYSTEM AND AUTHENTICATION METHOD

TECHNICAL FIELD

This disclosure relates to an imaging system that performs authentication of a user using biometric information and an authentication method used in such imaging system.

BACKGROUND ART

In recent years and continuing, the copying machine is being developed into an imaging apparatus with multiple functions including scanner functions, facsimile functions, and printer functions, for example. Also, the copying machine may have various functions related to copying such as a color copying function and a stapling function, for example.

It is noted that the copying machine as is described above is usually stationed at a corporate office. A corporate office has its own employees as well as employees of other corporations tending to their daily businesses, and the copying machine may be used by many of these individuals.

In view of the fact that the copying machine is commonly used by many users, there is an increasing demand for user authentication techniques to perform access control and log record management, for example. Conventional user authentication methods usually require direct action from the user such as inputting a password, presenting an IC card, or providing fingerprint data, for example. However, authentication techniques have been developed that do not require such direct action from the user such as the user face authentication.

Japanese Laid-Open Patent Publication No. 2000-300828 discloses a technique involving use of a CCD camera to input face data of a user for performing user authentication. Japanese Laid-Open Patent Publication No. 2000-329945 discloses extending the application of the above disclosed technique to plural digital copying machines.

In the above cited documents, no disclosures are made with regard to the input timing of the user face data other than mentioning that "when a user is standing in front of the copying machine, a sensor detects the presence of the user". However, it is noted that in a case where user authentication is not based on actions by the user that are consciously directed for authentication (e.g., presenting an IC card), it is quite important to determine the start timing of a user authentication process. According to the techniques disclosed in the above cited documents, the sensor may be activated even when a person is merely passing by the copying machine, and unnecessary authentication operations may be started, for example. Further, even in a case where the user is standing in front of the copying machine, the user may not necessarily be facing the camera when authentication operations are started, and image data required for face authentication may not be obtained. As a result, the authentication may end in failure, and an authentication failure event may be needlessly recorded in the log, for example.

Also, the disclosures of the above cited documents relate to a user authentication performed before a user operates the copying machine (login); however, no reference is made of logout operations performed after the user ends operation of the copying machine. It is noted that a user may be required to perform specific logout operations upon leaving the copying machine, or the user may simply leave the copying machine and automatic logout may be realized after no action is detected by the sensor for a predetermined period of time, for example. In the former case, user manipulations are increased and the user may possibly forget to execute the logout manipulations. In the latter case, another user may possibly approach the copying machine before the predetermined time period has elapsed and operate the copying machine as if he/she were the authenticated user, for example.

SUMMARY

According to an aspect of this disclosure, an imaging system that performs authentication of a user using biometric information and an authentication method are provided that do not require the user to perform specific actions for authentication.

In another aspect of this disclosure, an imaging system that performs authentication of a user includes:

one or more manipulation detecting parts that detect one or more manipulations by the user related to an imaging process;

one or more biometric information acquiring parts that acquire biometric information of the user when the manipulation detecting parts detect the manipulations by the user; and an authentication determining part that determines an authentication result of the authentication based on the biometric information acquired by the biometric information acquiring parts.

In a preferred embodiment, a predetermined manipulation detecting part of the manipulation detecting parts and a predetermined biometric information acquiring part of the biometric information acquiring parts are grouped together, and the predetermined biometric information acquiring part acquires the biometric information when the predetermined manipulation detecting part detects the manipulations by the user.

In another preferred embodiment, the predetermined manipulation detecting part and the predetermined biometric information acquiring part are arranged in a predetermined positional relationship.

In another preferred embodiment, the imaging system of the present invention includes:

a biometric information storing part that stores pre-acquired biometric information; and a matching part that compares and matches the biometric information acquired by the biometric information acquiring part with the pre-acquired biometric information stored in the biometric information storing part;

wherein the authentication determining part determines the authentication result based on one or more matching results obtained by the matching part.

In another preferred embodiment, when at least one of a predetermined number of the matching results is obtained and at least another one of the predetermined number of the matching results is not obtained, the authentication determining part determines the authentication result based on the obtained matching result.

In another preferred embodiment, authentication failure is determined by the authentication determining part when at least one of a predetermined number of the matching results is not obtained.

In another preferred embodiment, when authentication success is determined by the authentication determining part, the authentication success becomes invalid as soon as the imaging process related to the detected manipulations by the user is completed.

In another aspect of this disclosure, an imaging system that performs authentication of a user includes:

an imaging apparatus including one or more sensors that detect one or more manipulations by the user related to an imaging process; and one or more image capturing units that acquire biometric information of the user when the sensors detect the manipulations by the user; and a server apparatus that is connected to the imaging apparatus and receives the biometric information from the imaging apparatus, the server apparatus including an authentication determining unit that determines an authentication result of the authentication based on the biometric information.

In another aspect of this disclosure, an authentication method used in an imaging system that performs authentication of a user includes:

one or more manipulation detecting steps for detecting one or more manipulations by the user related to an imaging process;

one or more biometric information acquiring steps for acquiring biometric information of the user when the manipulations by the user are detected in the manipulation detecting steps; and an authentication determining step for determining an authentication result of the authentication based on the biometric information of the user acquired in the biometric information acquiring steps.

In a preferred embodiment, a predetermined manipulation detecting step of the manipulation detecting steps and a predetermined biometric information acquiring step of the biometric information acquiring steps are grouped together, and the biometric information is acquired in the predetermined biometric information acquiring step when the manipulations by the user are detected in the predetermined manipulation detecting step.

In another preferred embodiment, the authentication method further includes:

a matching step for comparing and matching the biometric information acquired in the biometric information acquiring steps with pre-acquired biometric information;

wherein the authentication result is determined in the authentication determining step based on one or more matching results obtained in the matching step.

In another preferred embodiment, when at least one of a predetermined number of the matching results is obtained and at least another one of the predetermined number of the matching results is not obtained, the authentication result is determined based on the obtained matching result.

In another preferred embodiment, authentication failure is determined in the authentication determining step when a predetermined number of the matching results are not obtained.

In another preferred embodiment, when authentication success is determined in the authentication determining step, the authentication success becomes invalid as soon as the imaging process related to the detected manipulations by the user is completed.

BRIEF DESCRIPTION OF THE DRAWINGS

FIG. 5 is a table illustrating authentication determination processes according to a first embodiment of the present invention; and FIG. 6 is a table illustrating authentication determination processes according to a second embodiment of the present invention.

BEST MODE FOR CARRYING OUT THE INVENTION

In the following, preferred embodiments of the present invention are described with reference to the accompanying drawings.

Figure 1:
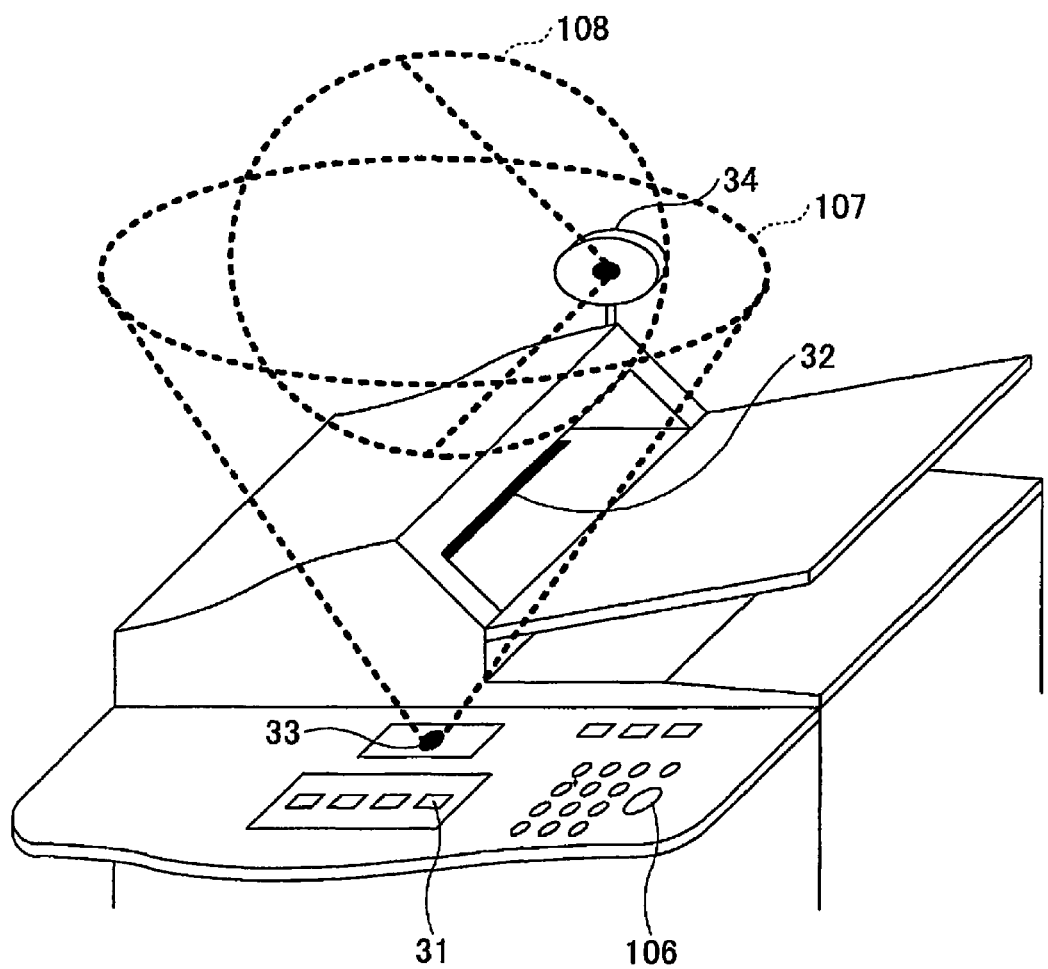
FIG. 1 is a diagram showing an external configuration of an imaging system according to an embodiment of the present invention.

FIG. 1 is a diagram showing an external configuration of an imaging system according to an embodiment of the present invention. The imaging system shown in FIG. 1 includes sensor A 31, sensor B 32, camera A 33, camera B 34, and a copy button 106. The copy button 106 may be pressed by a user for starting copying operations.

The sensor A 31 is arranged at an operations panel, and may be buttons for inputting information pertaining to copying conditions such as the number of copies, the resolution, and scaling, for example. The sensor 31 detects the pressing of any one of the buttons by the user.

The sensor B 32 is arranged at an ADF (automatic document feeder), and detects a paper document being placed at the ADF. It is noted that conventional techniques for switching on power when a paper document is placed at the ADF may be used in the present embodiment.

The camera A 33 captures the face of the user and acquires image data thereof when the sensor A 31 detects that one or more buttons have been manipulated (pressed) by the user. The camera A 33 has a field of view 107. The field of view 107 is arranged such that the face of the user may be easily captured when the user faces the operations panel to manipulate the buttons. It is noted that in the present embodiment, biometric information corresponds to image data and template data as is described below.

The camera B 34 captures the face of the user and obtains image data thereof when the sensor B 32 detects that a paper document is placed at the ADF. The camera B 34 has a field of view 108. The field of view 108 is arranged such that the face of the user may be easily captured when the user faces the ADF to place the paper document at the ADF.

In the present embodiment, the sensor A 31 and the camera A 33 are arranged in a predetermined positional relationship, and the sensor B 32 and the camera B 34 are arranged in a predetermined positional relationship. Specifically, the sensors A 31 and B 32 and the cameras A 33 and B 34 are respectively positioned such that the cameras A 33 and B 34 may easily capture the face of the user from the front side when the sensors A 31 and B 32 detect manipulations by the user.

In this way, facial image data of the user may be obtained for realizing user authentication without requiring the user to perform a direct action for authentication or consciously turn to face the camera, for example.

Figure 2:
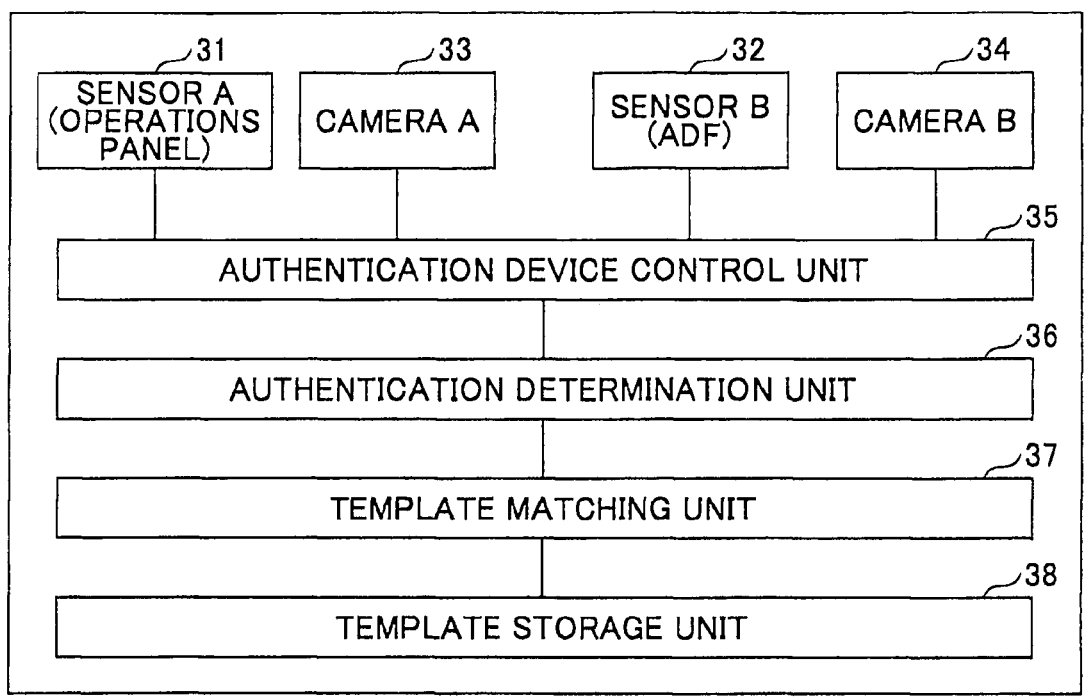
FIG. 2 is a block diagram showing a configuration of a stand alone imaging system according to an embodiment of the present invention.
Figure 3:
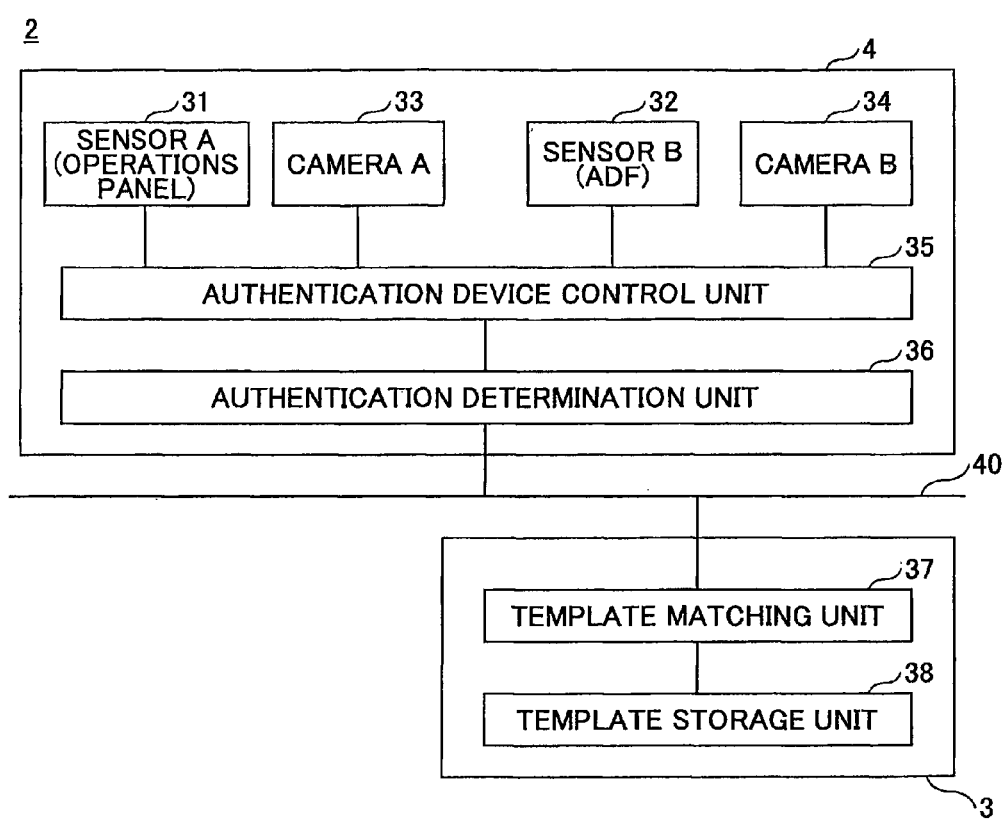
FIG. 3 is a block diagram showing a configuration of an imaging system according to an embodiment of the present invention.

In the following, configurations of an imaging system according to one embodiment of the present invention are described with reference to FIGS. 2 and 3. FIG. 2 is a block diagram showing a configuration of a stand alone imaging system according to an embodiment of the present invention. FIG. 3 is a block diagram showing a configuration of an imaging system according to another embodiment of the present invention that is made up of an imaging apparatus 4 and a template server 3 that are distributed over a network 40. The difference between the system configurations of FIGS. 2 and 3 lies in whether elements of the system are distributed over the network 40. In the following descriptions, the common elements of FIGS. 2 and 3 are given the same numerical references.

According to the present embodiment, an authentication device control unit 35 issues image capture commands to the corresponding cameras A 33 and B 34 upon receiving signals from the sensors A 31 and B 32, respectively, and transmits captured image data to an authentication determination unit 36. The authentication determination unit 36 extracts a template to be used for matching from the image data transmitted thereto, and transmits the extracted template to a template matching unit 37. Also, the authentication determination unit 36 receives matching results from the template matching unit 37, and makes a final determination on the authentication based on the matching results.

It is noted that the final determination corresponds to the authentication result, and the result are applied in a manner authentications results obtained in other authentication methods (e.g., ID/password authentication, IC card authentication, fingerprint authentication) are typically used including restricting usage (e.g., scanning operations) of the imaging system, controlling access to documents stored in the imaging system, and/or recording a security log, for example.

The template matching unit 37 compares the template received from the authentication determination unit 36 with a group of templates stored in the template storage unit 38 to determine which of the templates (i.e., users identified by the templates) most likely corresponds to the received template. The template storage unit 38 stores templates to be used in the matching process of the template matching unit 37. It is noted that specific functions and operations of the template matching unit 37 and the template storage unit 38 may conform to conventional authentication techniques.

Figure 4:
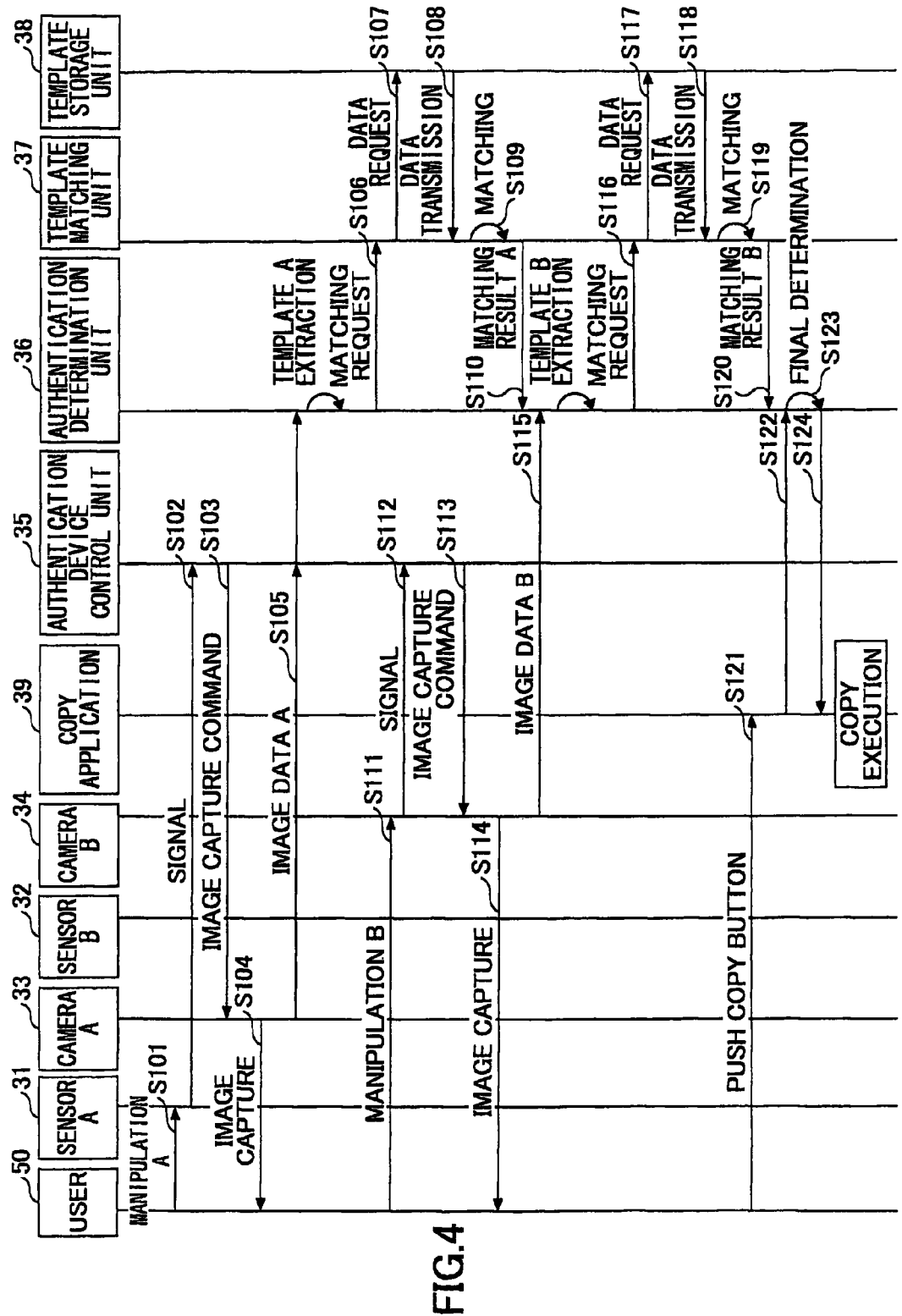
FIG. 4 is a sequence chart illustrating authentication processes according to an embodiment of the present invention.

FIG. 4 is a sequence chart illustrating authentication processes that are executed when a user performs manipulations A and B. Specifically, FIG. 4 illustrates processes between the sensor A 31, the sensor B 32, the camera A 33, the camera B 34, a copy application 39, the authentication device control unit 35, the authentication determination unit 36, the template matching unit 37, and the template storage unit 38. The copy application 39 is an application for executing processes related to copying. Also, in the following descriptions, manipulation A corresponds to a user manipulation that involves pressing buttons for setting copying conditions such as the number of copies, the resolution, and scaling, and manipulation B corresponds to a user manipulation that involves placing paper at the ADF.

In step S101, a user 50 performs manipulation A, and the sensor A 31 detects the manipulation. Then, in step S102, the sensor A 31 transmits a signal to the authentication device control unit 35 to inform the authentication device control unit 35 of detecting the manipulation. In step S103, the authentication device control unit 35 transmits an image capture command to the camera A 33, which belongs to the same group as the sensor A 31. In step S104, the camera A 33 captures the image of the user 50. Then, in step S105, image data A of the captured image are transmitted to the authentication determination unit 36 via the authentication device control unit 35.

In step S106, the authentication determination unit 36 extracts template A from the image data A, and sends a request to the template matching unit 37 to perform template matching. In step S107, the template matching unit 37 sends a request for data to the template storage unit 38. Specifically, the template matching unit requests for data of a group of templates stored in the template storage unit 38. In step S108, the template storage unit 38 transmits the data to the template matching unit 37.

Upon receiving the data from the template storage unit 38, the template matching unit 37 searches for a template that matches the template A from the received data to obtain a matching result A in step S109. Then in step S110, the template matching unit 37 transmits the matching result A to the authentication determination unit 36.

In step S111, the user 50 performs manipulation B, and the sensor B 32 detects the manipulation. In step S112, the sensor B 32 transmits a signal to the authentication device control unit 35 informing the authentication device control unit 35 of detecting the manipulation. In step S113, the authentication device control unit 35 transmits an image capture command to the camera B 34, which belongs to the same group as the sensor B 32. In step S114, the camera B 34 captures an image of the user 50. In step S115, image data B of the captured image are transmitted to the authentication determination unit 36 via the authentication device control unit 35.

The authentication determination unit 36 extracts template B from the image data B, and sends a request to the template matching unit 37 to perform template matching in step S116. In step S117, the template matching unit 37 sends a request for data to the template storage unit 38. In step S118, the template storage unit 38 transmits the requested data.

Upon receiving the data from the template storage unit 38, the template matching unit 37 searches for a template matching the template B from the received data to obtain matching result B in step S119. In step S120, the template matching unit 37 transmits the matching result B to the authentication determination unit 36.

As can be appreciated, the authentication determination unit 36 obtains two matching results from the processes described above. In step S121, the user 50 presses the copy button 106. In turn, the copy application 39 sends a request to the authentication determination unit 36 for an authentication result in step S122. The authentication determination unit 36 makes a final determination in step S123, and transmits the final determination as the authentication result to the copy application 39 in step S124. In the illustrated example, the user is successfully authenticated by the authentication processes, and the copy application 39 receiving the authentication result from the authentication determination unit 36 executes copying operations.

After the copying operations are completed, the authentication result previously obtained by the authentication determination unit 36 is automatically invalidated since the authentication determination unit 36 does retain its authentication result.

For example, in a case where a subsequent paper document is to be copied immediately after copying one paper document, copying conditions may be reset and the paper document may be replaced by the subsequent paper document. In this case, the process sequence for one copying operation may be regarded as one imaging process, and each time a user requests a copying operation to copy another set of paper document, face data for user authentication is required.

By performing user authentication each time an imaging process is executed, a user who is different from the previous user may be prevented from posing as the previously authenticated user and operating the copying machine when the previous user forgets to perform logout operations upon leaving the copying machine, for example. It is noted that such a technique of performing user authentication for each imaging process has not been practical in applications requiring the user to perform a direct action for user authentication (e.g., finger print authentication) since too great a burden may be placed on the user and usability may be degraded.

It is noted that manipulation detecting steps according to an embodiment of the present invention may include steps S102 and S112 of FIG. 4, for example. Also, biometric information acquiring steps according to an embodiment of the present invention may include steps S104 and S114 of FIG. 4, for example. An authentication determining step according to an embodiment of the present invention may include step S123 of FIG. 4, for example, and a matching step according to an embodiment of the present invention may include steps S109 and S119 of FIG. 4, for example.

In the following, authentication determination processes executed by the authentication determination unit 36 are described with reference to FIGS. 5 and 6.

FIG. 5 is a table illustrating authentication processes that may be executed by the authentication determination unit 36 according to a first embodiment. The illustrated authentication processes of FIG. 5 includes cases where a predetermined number of matching results are not obtained and an authentication determination is made based on the obtained matching result. In the table of FIG. 5, the vertical axis represents the matching result A, and the horizontal axis represents the matching result B. The matching results A and B are obtained by the template matching unit 37 based on the templates A and B, respectively. The matching results A and B may represent "USER X" when the template matching unit 37 determines that the template of user X matches the template extracted from the image data of the user currently operating the imaging system. Similarly, the matching results A and B may represent "USER Y" when the template matching unit 37 determines that the template of user Y matches the extracted template of the user currently operating the imaging system.

Also, "NOT EXECUTED" refers to a case in which image capture is not performed due to the fact that the relevant user manipulation based on which the matching result A or B is obtained such as the pressing of a button of the operations panel or the placing of a paper document at the ADF is not performed by the current user. In this case, the corresponding authentication result may not be obtained.

The intersecting points of the vertical axis and the horizontal axis represent determination results obtained by the authentication determination unit 36. When the matching results A and B are the same, the determination result of the authentication determination unit 36 represents the same information as the matching results A and B. When the matching results A and B are not in agreement, the determination result of the authentication determination unit 36 represents authentication failure.

When one of the matching results A or B is not obtained, and the obtained matching result represents a successful match, the obtained matching result corresponds to the determination result of the authentication determination unit 36.

As can be appreciated, in the determination process of FIG. 5, when one of the two predetermined matching results A or B cannot be obtained, an authentication determination is made based on the obtained matching result. It is noted that the determination process of FIG. 5 may be able to adequately respond to a case where a document is placed at the ADF and copying operations are started without the operations panel being manipulated, for example.

FIG. 6 is a table illustrating determination processes that may be executed by the authentication determination unit 36 according to a second embodiment. The illustrated processes of FIG. 6 include a case of indicating authentication failure when the predetermined number of matching results cannot be obtained.

According to FIG. 6, when the matching results A and B are the same, the determination result of the authentication determination unit 36 represents the same information as those of the matching results A and B. When the matching results A and B are not in agreement, the determination result of the authentication determination unit 36 represents authentication failure.

When one of the two matching results A and B are not obtained, the authentication result represents authentication failure regardless of the obtained matching result. Since the determination process of FIG. 6 requires the same matching result be obtained plural times, recognition errors may be reduced and accurate user authentication may be performed, for example.

It is noted that in the authentication determination processes described above, two sets of cameras and sensors are used. However, the present invention is in no way limited to such an arrangement, and three or more sets of cameras and sensors may be used in other examples. Also, in another example, one set of a sensor and a camera may be used and image capture may be performed at different timings to obtain plural matching results.

It is noted that in the case of scanning a paper document at an imaging system, oftentimes, plural buttons of the operations panel may be pressed for adjusting scanning conditions before pressing the copy start button for starting the copying operations. In this case, image capturing and template matching may be performed each time a button of the operations panel is pressed (or alternatively, arrangements may be made to prevent image capturing/template matching processes from occurring too frequently by setting a minimum time interval between image capturing/template matching processes or setting the maximum number of times such processes may be performed, for example). In this way, three or more matching results may be obtained using two cameras so that the authentication success rate may be raised in the authentication determination process of FIG. 5 and recognition errors may be reduced in the authentication determination process of FIG. 6, for example.

It is noted that manipulation detecting parts according to an embodiment of the present invention may include the sensor A 31 and the sensor B 32, for example. Biometric information acquiring parts according to an embodiment of the present invention may include the camera A 33 and the camera B 34, for example. An authentication determining part according to an embodiment of the present invention may include the authentication determination unit 36, for example. A biometric information storage part according to an embodiment of the present invention may include the template storage unit 38, for example. A matching part according to an embodiment of the present invention may include the template matching unit 37, for example.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-234715 filed on Aug. 12, 2005, the entire contents of which are hereby incorporated by reference.

The invention claimed is:

1. An imaging system that performs authentication of a user and that is configured to perform a copying operation and a scanning operation, the system comprising:
   an operation input unit for the user to set conditions for at least one of the copying operation and the scanning operation;
   an automatic document feeder unit;
   a plurality of manipulation detecting parts including a first sensor that detects one or more manipulations by the user of the operation input unit to set the conditions for said at least one of the copying operation and the scanning operation, and a second sensor that detects a recording medium being placed in the automatic document feeder unit;
   a plurality of biometric information acquiring parts that acquire biometric information of the user when the manipulation detecting parts detect the manipulations by the user, the biometric information acquiring parts include
      a first camera disposed to capture a first facial image of the user at a first predetermined location relative to the operation input unit, when the first sensor detects the one or more manipulations by the user of the operation input unit, and
      a second camera disposed to capture a second facial image of the user at a second predetermined location relative to the automatic document feeder unit, when the second sensor detects the recording medium placed in the automatic document feeder unit;
   an authentication determining part that determines an authentication result of the authentication based on the biometric information acquired by the biometric information acquiring parts;
   a biometric information storing part that stores pre-acquired biometric information; and
   a matching part that compares and matches the biometric information acquired by the biometric information acquiring part with the pre-acquired biometric information stored in the biometric information storing part,
   wherein the authentication determining part determines the authentication result based on one or more matching results obtained by the matching part,
   wherein in a case that the authentication result determined by the authentication determining part corresponds to authentication success, the authentication result corresponding to authentication success becomes invalid after an imaging process that is related to the detected manipulations by the user is completed.

2. The imaging system as claimed in claim 1, wherein a predetermined manipulation detecting part of the manipulation detecting parts and a predetermined biometric information acquiring part of the biometric information acquiring parts are grouped together, and the predetermined biometric information acquiring part acquires the biometric information when the predetermined manipulation detecting part detects the manipulations by the user.

3. The imaging system as claimed in claim 2, wherein the predetermined manipulation detecting part and the predetermined biometric information acquiring part are arranged in a predetermined positional relationship.

4. The imaging system as claimed in claim 1, wherein when at least one of a predetermined number of the matching results is obtained and at least another one of the predetermined number of the matching results is not obtained, the authentication determining part determines the authentication result based on the obtained matching results.

5. The imaging system as claimed in claim 1, wherein authentication failure is determined by the authentication determining part when at least one of a predetermined number of the matching results is not obtained.

6. The imaging system as claimed in claim 1, wherein the authentication determining part performs authentication each time one of the copying operation and the scanning operation is set.

7. The imaging system as claimed in claim 1, wherein the authentication determining part determines successful authentication only when matching results are obtained for both of the first facial image of the user captured by the first camera and the second facial image of the user captured by the second camera.

8. The imaging system as claimed in claim 1, wherein when the authentication result corresponds to authentication success, the authentication result corresponding to authentication success becomes invalid after said at least one of the copying operation and the scanning operation is completed.

9. The imaging system as claimed in claim 1, wherein the user is prevented from performing the copying operation and the scanning operation when the authentication result corresponding to authentication success becomes invalid.

10. The imaging system as claimed in claim 1, wherein when the detected manipulations detected by the manipulation detecting parts correspond to the copying operation and the authentication result corresponds to authentication success, the authentication result corresponding to authentication success becomes invalid after the copying operation is completed.

11. The imaging system as claimed in claim 1, wherein when the detected manipulations detected by the manipulation detecting parts correspond to the scanning operation and the authentication result corresponds to authentication success, the authentication result corresponding to authentication success becomes invalid after the scanning operation is completed.

12. An imaging system that performs authentication of a user and that is configured to perform a copying operation and a scanning operation, the system comprising:
   an imaging apparatus including
      an operation input unit for the user to set conditions for at least one of the copying operation and the scanning operation;
      an automatic document feeder unit;
      a plurality of sensors including a first sensor that detects one or more manipulations by the user of the operation input unit to set the conditions for said at least one of the copying operation and the scanning operation, and a second sensor that detects a recording medium being placed in the automatic document feeder unit; and
   a plurality of image capturing units that acquire biometric information of the user when the sensors detect the manipulations by the user, the image capturing units include
      a first camera disposed to capture a first facial image of the user at a first predetermined location relative to the operation input unit, when the first sensor detects the one or more manipulations by the user of the operation input unit, and
      a second camera disposed to capture a second facial image of the user at a second predetermined location relative to the automatic document feeder unit, when the second sensor detects the recording medium placed in the automatic document feeder unit; and a server apparatus that is connected to the imaging apparatus and receives the biometric information from the imaging apparatus, the server apparatus including an authentication determining unit that determines an authentication result of the authentication based on the biometric information, wherein in a case that the authentication result determined by the authentication determining part corresponds to authentication success, the authentication result corresponding to authentication success becomes invalid after an imaging process that is related to the detected manipulations by the user is completed.

13. An authentication method used in an imaging system that performs authentication of a user and that is configured to perform a copying operation and a scanning operation, the system including an automatic document feeder unit and an operation input unit for the user to set conditions for at least one of the copying operation and the scanning operation, the method comprising:

one or more manipulation detecting steps for detecting one or more manipulations by the user that are related to an imaging process, the manipulation detecting steps including detecting, by a first sensor, one or more manipulations by the user of the operation input unit to set the conditions for said at least one of the copying operation and the scanning operation, and detecting, by a second sensor, a recording medium being placed in the automatic document feeder unit;

one or more biometric information acquiring steps for acquiring biometric information of the user when the manipulations by the user are detected in the manipulation detecting steps disposing a first camera to capture a first facial image of the user at a first predetermined location relative to the operation input unit, when the first sensor detects the one or more manipulations by the user of the operation input unit, and disposing a second camera to capture a second facial image of the user at a second predetermined location relative to the automatic document feeder unit, when the second sensor detects the recording medium placed in the automatic document feeder unit;

an authentication determining step for determining an authentication result of the authentication based on the biometric information of the user acquired in the biometric information acquiring steps; and a matching step for comparing and matching the biometric information acquired in the biometric information acquiring steps with pre-acquired biometric information, wherein the authentication result is determined in the authentication determining step based on one or more matching results obtained in the matching step, wherein in a case that the authentication result determined in the authentication determining step corresponds to authentication success, the authentication result corresponding to authentication success becomes invalid after an imaging process that is related to the detected manipulations by the user is completed.

14. The authentication method as claimed in claim 13, wherein a predetermined manipulation detecting step of the manipulation detecting steps and a predetermined biometric information acquiring step of the biometric information acquiring steps are grouped together, and the biometric information is acquired in the predetermined biometric information acquiring step when the manipulations by the user are detected in the predetermined manipulation detecting step.

15. The authentication method as claimed in claim 13, wherein when at least one of a predetermined number of the matching results is obtained and at least another one of the predetermined number of the matching results is not obtained, the authentication result is determined based on the at least one of the matching results that is obtained.

16. The authentication method as claimed in claim 13, wherein authentication failure is determined in the authentication determining step when a predetermined number of the matching results are not obtained.

* * * * *

UNITED STATES PATENT AND TRADEMARK OFFICE
CERTIFICATE OF CORRECTION

| | | |
|---|---|---|
| PATENT NO. | : 8,209,752 B2 | |
| APPLICATION NO. | : 11/997522 | |
| DATED | : June 26, 2012 | |
| INVENTOR(S) | : Yusuke Ohta | |

It is certified that error appears in the above-identified patent and that said Letters Patent is hereby corrected as shown below:

Add the following Foreign Application Priority Data section on the cover page of the patent:

--(30)      Foreign Application Priority Data

August 12, 2005      (JP)      2005-234715--

Signed and Sealed this
Ninth Day of October, 2012

David J. Kappos
*Director of the United States Patent and Trademark Office*